April 7, 1959  R. W. FENEMORE ET AL  2,880,512
MEASURING APPARATUS

Filed May 25, 1954  4 Sheets-Sheet 1

INVENTOR
RONALD WILLIAM FENEMORE
COLIN RODERICK BORLEY
BY Fred M Vogel
AGENT

April 7, 1959 R. W. FENEMORE ET AL 2,880,512
MEASURING APPARATUS

Filed May 25, 1954 4 Sheets-Sheet 2

INVENTOR
RONALD WILLIAM FENEMORE
COLIN RODERICK BORLEY
BY Fred M Vogel
AGENT

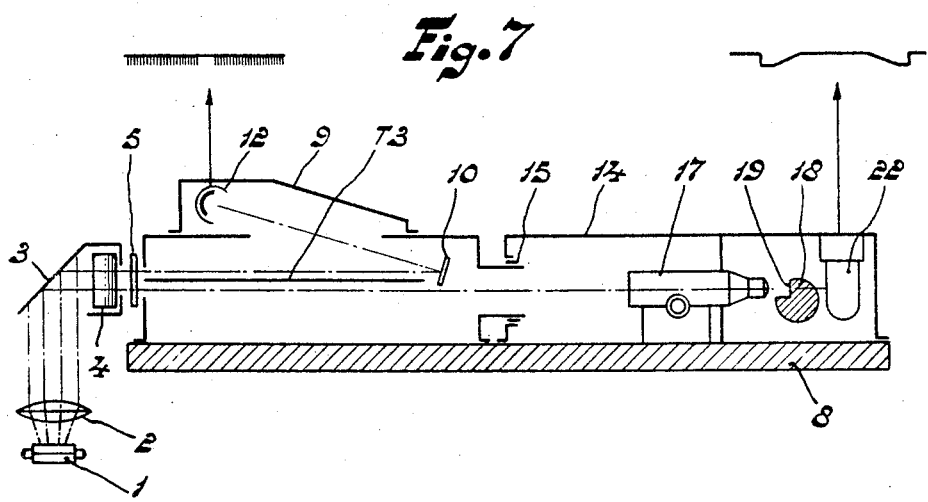
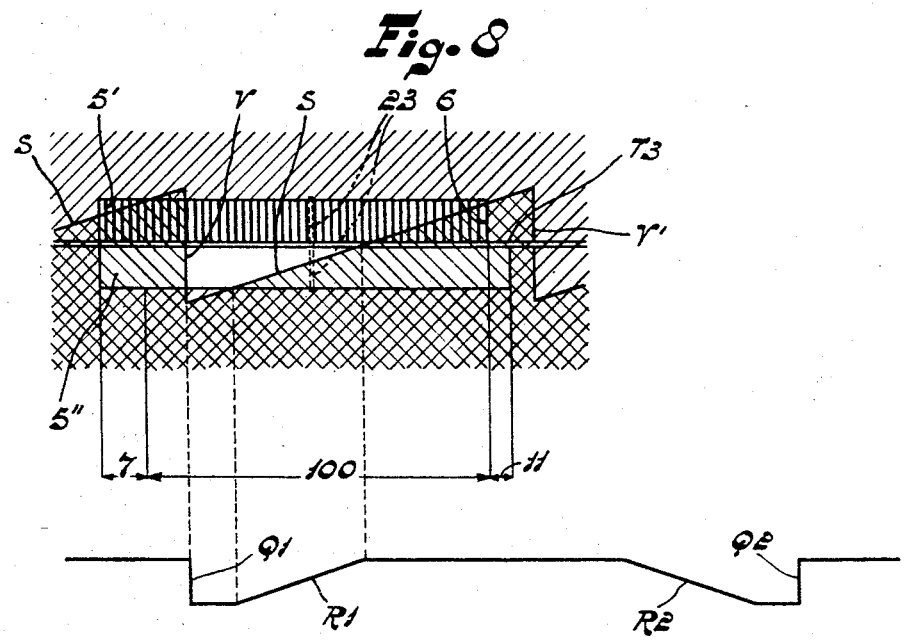

United States Patent Office 2,880,512
Patented Apr. 7, 1959

2,880,512

MEASURING APPARATUS

Ronald William Fenemore, Coulsdon, and Colin Roderick Borley, Hildonborough, England, assignors to The Mullard Radio Valve Company Limited, London, England Application May 25, 1954, Serial No. 432,267

Claims priority, application Great Britain May 26, 1953

6 Claims. (Cl. 33—125)

This invention relates to apparatus for measuring or indicating dimensions or relative positions and the invention relates more especially to apparatus for interpolating fractional distances between scale divisions.

Apparatus according to the present invention may be applied to many different devices where accurate positioning of a member making a sliding or angular movement is desired. For example in a jig boring machine which is employed for extremely accurate machining operations rectilinear movements of the table must be made with great precision. Normally these movements are manually controlled or power assisted under manual control, and vernier scales and optical magnification are employed to ensure as far as possible the desired degree of accuracy.

Mechanical scales of various kinds are in use for measuring or indicating lengths or distances and the scale divisions thereof may be constituted by marks or structural elements.

It is an object of the present invention to provided means whereby measurement of extreme accuracy may be effected by interpolation between scale divisions.

Apparatus according to the invention essentially includes means for creating a light pattern constituting an interpolation scale and photo-sensitive means for viewing such patterns through, or by reflection from, a gap or gaps between divisions of the main or coarse scale structure together with scanning means for converting the viewed portion of the pattern into a pulse train or series of pulse trains and an electrical counter or equivalent means for obtaining from the pulses an indication of relative position.

The main or coarse scale divisions may be cut or formed in an opaque structure or provided as opaque marks on a transparent scale member.

Preferably, the light pattern is obtained by optical reduction of an accurate large scale pattern plate such as a grid or the like illuminated by transmission or reflection and having opaque or light-absorbing interpolation divisions.

Where the source of light is directed at all the divisions of the pattern plate simultaneously, scanning of the pattern may be effected e.g. by a moving mask located on either side of the interpolation pattern plate and such mask may for example comprise a hollow cylinder with a helical slot co-operating with a fixed longitudinally slotted screen. Alternatively, the light source may be provided as a narrow beam which scans the pattern plate and this may be effected either by optical-mechanical means or by the electron beam of a cathode ray tube in the manner of a flying-spot scanner.

With arrangements according to the invention, the longitudinal profile or width of the main scale divisions is of little importance so long as one or another set of corresponding sides are formed or marked identically and with great accuracy for use as the reference lines of the interpolation system. This facilitates the construction of an accurate main scale. Such a scale may be a notched bar or alternatively it may be a flat plate or sawtooth outline at one edge, the perpendicular tooth edges being the accurate scale reference surfaces while the sloping edges may be of any profile which is convenient for manufacture and need not be accurately constant.

Specific embodiments of the present invention will now be described by way of example with reference to the accompanying drawings as applied to a sawtooth scale member which in this example is fixed to the moving table of a jig borer or other machine tool as part of the distance measuring equipment thereof to permit highly accurate, and it may be automatic, positioning.

In the drawings:

Fig. 7 shows a mechanical system for use with the alternative light-scanning arrangement of Figs. 5 and 6;

Fig. 8 shows a detail of Fig. 7;

Fixed to the table of the machine tool and extending along the length of the table is a horizontal main scale of sawtooth form. The vertical faces of the teeth are used as the graduations of the scale and are spaced apart by 1/10 inch to the required final accuracy. Failing this accuracy, the errors in position of the vertical edges will be measured and a correction applied in the measuring system.

Figure 11:
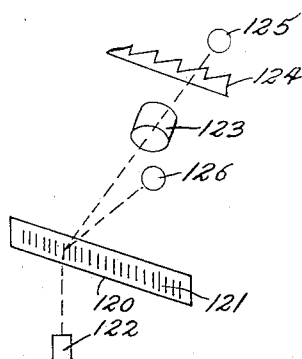
Fig. 11 snows a light-scanning arrangement suitable for use in the embodiment of Figs. 1 to 4.

To subdivide these 1/10 inch intervals into thousandths or ten thousandths of an inch, the following system, shown in Fig. 11, is employed. A stationary pattern plate 120 or transparent interpolation scale some 4 inches to 10 inches long is evenly divided up by opaque markings 121 so as to allow transmission of light at 100 or 1000 evenly spaced points. This scale is scanned by a spot of light from a light source 122 at least a small as the openings in the scale. The spot traverses the scale preferably with uniform or approximately uniform velocity in the same direction at each scan, and the scanning process is repeated many times per second. A high quality lens 123 of numerical aperture sufficient for the resolution required forms a reduced image of the scanned scale at the sawtooth main scale 124. The reduction is such that the images of 100 or 1000 markings can fit precisely between two successive vertical edges of the main scale.

In practice, more than 100, or 1000 markings will be present at the scale, say 110 or 1010, but the reduction will be such that just 100 or 1000 of them can fit between two main scale divisions which are exactly 1/10 inch apart. The remainder will be ignored or will serve to measure the error of spacing of two consecutive vertical edges.

The light transmitted past the sawtooth edge of the main scale is received by a photocell 125 which, owing to the scan, provides an output consisting of interrupted pulse trains.

Figure 1:
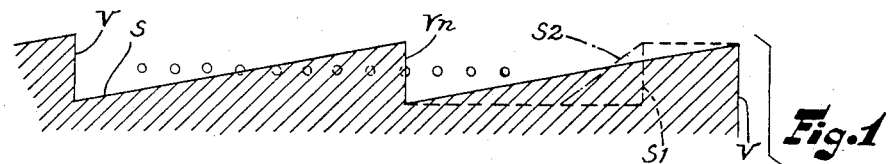
Figures 1 and 2 represent diagrammatically the light pattern and pulse train conditions corresponding to two different counts, it being understood that the pulses are shown aligned with the pattern elements solely for the purpose of clarity, the pattern being on a length or distance scale while the pulse trains are on a time scale.
Figure 2:
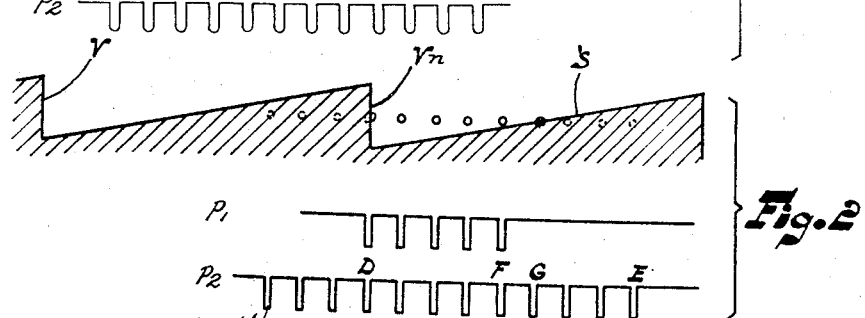

Referring to Figures 1 and 2, in which interpolation by 10 with a scale of twelve spots is shown for simplicity instead of by 100 or 1000, the measuring number of pulses occurs between edge $V_n$ and the next vertical edge V to the right of edge $V_n$ in the scale, and the last pulse in the scan is the measure of the subdivision of the $1/10$ of an inch with respect to the edge $V_n$. As the main scale moves to the left, this measure increases. Eventually the sloping edge S is encountered and the desired portion of the pulse train would be interrupted if only one photocell 125 were used. To continue counting correctly, the interpolation scale is also viewed directly by a second photocell 126 (see Fig. 11) whose output consists of the uninterrupted pulse train. The two available pulse trains are shown in Figure 2 for a case where the sloping edge S is encountered during the count.

In Fig. 2, the vertical edge $V_n$ was obviously encountered at D and the count should proceed to E, to give a count of 8 in this case. Evidently counting should begin at D where the first coincidence between pulses in the two trains occurs. The last coincidence occurs at F and the anti-coincidence which occurs at G must not stop the counting process. Relatively simple gating circuits could make this possible.

However, the case of Figure 1 requires different treatment.

As soon as the scan commences, a coincidence occurs at H and, with the circuits provided, counting will begin. The anticoincidence at K does not stop this process and the next coincidence D will, unless prevented by an additional circuit, allow counting to continue. In this case, which will hold for a range of possible main scale positions, the whole train is counted regardless of position, and this is undesirable. With an additional circuit, however, it is arranged that a coincidence (as D) which was preceded by an anticoincidence (as K or K'), resets the counter, rejecting all of the count from H to D. Successive coincidences, (as F.G) leave the counter to operate undisturbed. Thus the desired number of counts is contained in the counter at the end of each scan. If a scan begins with an anticoincidence, this is noted and prepares the circuits for the first coincidence and counting starts at the first coincidence. Counting continues even if anticoincidences occur subsequently, but the circuits became prepared in this case for automatic resetting upon the occurrence of a further coincidence if it should follow. This case of "anti-c, c, anti-c, c," can occur with scans that are longer than the distance between main scale divisions. The first c, being preceded by anti-c, applies a reset-to-zero pulse to the counter. Counting continues up to the second c which again applies a reset-to-zero pulse to the counter, rejecting the count up to that point. Counting starts afresh at this second c and the end of the scan cycle sees the count from the last vertical edge V to the last pulse in the counter as required.

Figure 3:
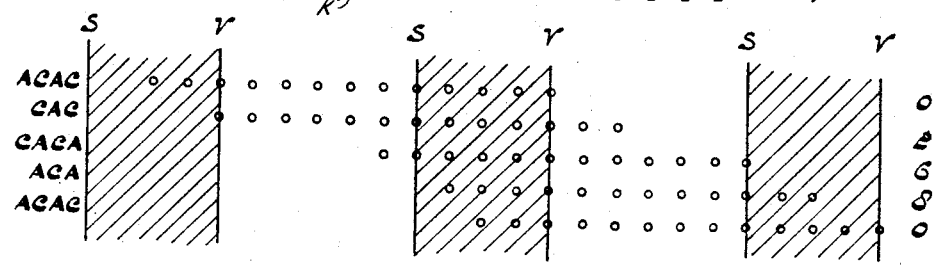
Figure 3 is a diagram representing the conditions for various counts.

The sequence of cases that occur as the main scale moves to the left (scan to right) are shown in Figure 3 for a $1/10$ interpolation with 13 pulses.

If the scan length is shorter than the distance between the point of interception with a sloping edge S of one sawtooth, and the vertical edge V of an adjacent sawtooth, the four cases listed are the only four that can occur. All contain the sequence "anti-coincidence (A)— coincidence (C)" followed either by A or nothing. The A.C. sequence ensures the correct count. Whether this is followed by a further A.C. sequence or nothing will determine the state in which the circuits are left at the end of the scan. But since each case sequence contains at least three changes with A and C alternating, the condition of the circuit at the beginning of the next count will not matter as a sequence A.C. will occur in any case to begin the count from the correct vertical edge V. Reset at the end of each scan is not necessary, provided there is sufficient length of scan (i.e. more than 10 interpolation divisions in the example given).

Figure 4:
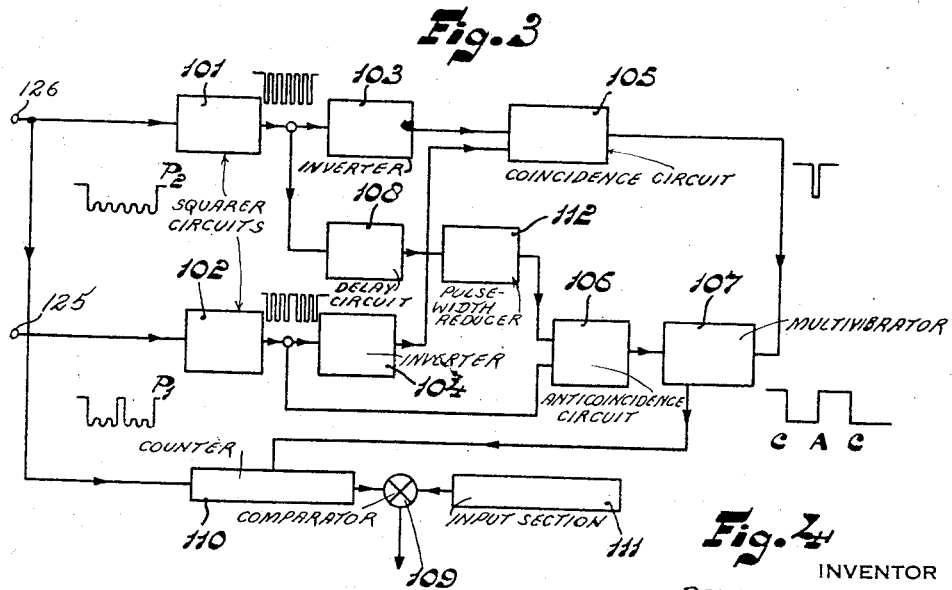
Figure 4 is a block schematic circuit diagram.

Figure 4 is a block schematic diagram of the circuit used in this example. Photoelectron multipliers 125, 126 are used to view the optical image of the interpolation scale, as shown in Fig. 11. The squarer circuits 101 and 102 produce pulses of some 100 volts amplitude and in the process invert the pulses. For this reason inverters 103 and 104 are provided by which both pulse trains are again inverted so that light transmission gives rise to a positive going pulse. The pulses are fed to the coincidence gate circuit 105 which may comprise a single pentode valve with sharp cut-off control grid and suppressor grid characteristics. A coincidence of input pulses from the photo tubes 125 and 126 causes positive-going pulses to be applied to the control grid and suppressor grid of the coincidence circuit 105, and thus gives rise to a negative-going pulse at the anode thereof which is fed to one anode of a bistable multivibrator 107. An enlarged negative pulse is available at the first anode for reset-to-zero purposes and the occurrence of the first coincidence is thus registered by the state of the bistable multivibrator.

In the delay and pulse width circuits 108 and 112 the pulses of the continuous pulse train from $P_2$ are delayed by $1/4$ of the pulse width to and reduced in width $1/2$ the pulse width. This ensures that a spurious anti-coincidence should not be registered should a pulse of the interrupted train from $P_1$ occur slightly out of phase with a $P_2$ pulse. An anticoincidence circuit 106 is provided, and may comprise the usual circuit in which input signals are fed to the cathode and grid of an amplifier tube. In this case, the input signals are from the circuits 102 and 112. Occurrence of a first anti-coincidence applies by means of the pentode anti-coincidence gate circuit 106 a negative-going trigger signal to the other valve of the bistable multivibrator, registering the anti-coincidence as the new state of the bistable multivibrator. Then, on the occurrence of a subsequent first coincidence, the bistable multivibrator is restored to its original state and in so doing produces a negative-going square wave used to reset the counter rapidly to zero in time to permit it to start an effective count.

The counter 110 is fed from the continuous pulse train from $P_2$ and its counts are compared in the comparator 109 with a required number or dimension set up in the input section 111. Differences of either sign between the pre-set number of pulses from the input section 111 and the number of pulses from the counter 110 cause signals to be passed to an indicator, where manual adjustment of the machine tool or the like is employed, or to a servo mechanism if the adjustments are automatic. The preset number of pulses may be produced in the input section 111 by a chain of bistable stages, in the well-known manner.

The embodiment described above using sawtooth divisions VS may also be applied to square or trapezoidal main scale divisions as indicated at S1 or S2 in Fig. 1, or to other forms of division, accuracy and uniformity of the width or profile of the divisions being unnecessary so long as the reference edges V are accurately formed and spaced. The embodiment may also be applied with little modification to an arcuate or circular sawtooth scale where angular movements are to be effected or controlled, e.g. in fire control or gunlaying apparatus.

Figure 5:
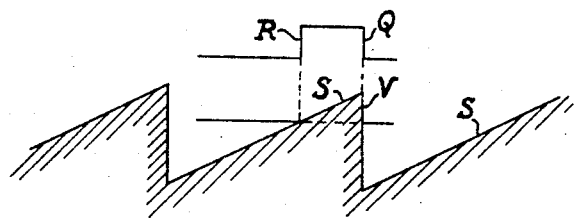
Figs. 5 and 6 show an alternative embodiment of the light-pattern scanning arrangement of Figs. 1 and 2.
Figure 6:
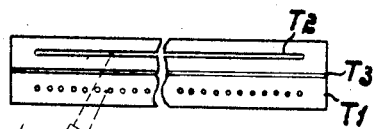

In an alternative embodiment illustrated diagrammatically in Figures 5 and 6 of the drawings, a scanner provides two sources $L_1$ and $L_2$ of moving light spots which, in the case of a horizontal scale, are maintained vertically above one another throughout the scan. One spot, from source $L_2$, performs an uninterrupted scan of the sawtooth scale. The other spot, from source $L_1$, is employed for generating pulses and is obscured intermittently during its sweep by a pattern plate or mask T1 (Figure 6) so as to permit interpolation between vertical fiduciary edges V of the scale. However, in forming a reduced image of the scanning pattern, only the sawtooth scanning spot is used, the pulse-generating spot being being shielded from the reducing lens system and viewed by a separate photocell. This latter photocell provides, therefore, a pulse train which lasts throughout the scan. The sawtooth scanning spot is interrupted only by the sawtooth scale and the output voltage of the corresponding photocell is shown in the upper part of Figure 5. As this spot emerges from behind the vertical edge V, the cell current rises abruptly so that its output voltages go negative (Q), and this change is distinguishable from the positive-going change (R) in output obtained when the spot goes behind the sloping edge S. The negative-going edge Q is used as the signal which starts counting of the pulses constituting the output of the pulse-generating photocell. The number counted at the end of the scan provides the required interpolation. The two light spots may, if desired, be obtained by a vertical line of light traversing a horizontal pattern plate or mask such as that shown in Figure 6. The mask has a continuous slot T2 for the sawtooth scanning spot and a series of apertures T1 for the pulse generating spot, the latter being shielded from the optical reducing system by a partition or reflector T3. In the embodiment of Fig. 6, the reducing lens system for the sawtooth scanning light spot L2 is the same as the lens system 123 in the embodiment of Fig. 11, and the mask T1 corresponds to the pattern plate 120 of Fig. 11.

An arrangement based on the system described above with the aid of Figures 5 and 6 will now be described in greater detail with reference to Figures 7 to 10 of the accompanying drawings as applied to the horizontally slidable table of a machine tool. In this arrangement the main or coarse scale used is a scale member, comprising a threaded element wherin one of the two sides of the helical threading is formed as an accurate reference surface and wherein the profile of the threading is exposed along a longitudinal face. This scale member provides 0.1″ coarse scale divisions while the interpolation scale has 100 divisions so as to give measurement to the nearest thousandth of an inch, but these dimensions and others given in the following description are merely given by way of example to facilitate explanation of the system.

Referring now to Figure 7, a stationary light source comprising a line filament bulb 1 and condensing lens 2 provides a vertical parallel beam of light within which reciprocates a scanner comprising a 45° mirror 3 with a vertical cylindrical lens 4. The scanner is on a carriage (not shown) which is reciprocated by any suitable means in a horizontal direction normal to the plane of the drawing, and the mirror 3 thus moves to and fro within the beam and reflects a constant fraction thereof towards the lens 4. The latter is a rod of glass 1″ long by ½″ diameter ground and polished. It is placed with its axis vertical and forms a vertical line image of the line filament about ⅛″ away from its surface. The width of the line image after reduction by an objective system 17 (to be described hereinafter) is about ⅕ of a thousandth of an inch.

The optical system is mounted on a movable bed plate 8. The interpolation scale plate 5, to be described later, is secured, in a fixed position, adjacent to the scanner, across a horizontal rectangular aperture in the end of a light-excluding box 9 which is supported by the movable bed plate 8. A horizontal dividing plate or partition T3 divides the scale plate into upper and lower sections and also divides the box 9 in a similar way. A mirror 10 reflects light from the upper section of the scale onto a photomultiplier cell 12. The box 9 with its contents, the scanner and the light source, are attached to a slide which may be moved through a small distance with respect to the bed plate 8 to allow adjustment of the length of the system and hence the optical reduction factor, which is e.g. 40:1. A second light-excluding box 14 is rigidly attached to the bed plate 8 and is connected to box 9 by a telescopic joint 15. Box 14 contains a microscope body 17 which carries a ⅔″ objective and has rack and pinion focussing adjustment. The threaded main or coarse scale which is attached to the moving table, is indicated at 18 and is placed with its measuring face 19 opposite the objective and a photomultiplier cell 22 is attached to the bed plate 8 on the side of the coarse scale 18 remote from the objective.

In order to avoid severe loss of resolution and photocell overloading, reflection at grazing incidence on the lower surface of the dividing plate T3 must be avoided. Otherwise a second irregular image of the line of light will be visible to the microscope objective. Alternatively a high quality mirror may be used to deliberately double the length of the line of light as seen by the objective. It is also important to suppress reflections from the walls of the boxes 9 and 14.

As shown in Figure 8, the scale plate 5 comprises an upper section 5′ with opaque scale markings and a lower clear section 5″. The interpolation scale of the plate section 5′ may be obtained e.g. by photographic reduction of an enlarged black and white drawing or by direct engraving. The view shown in Figure 8 is a composite view, the lower half being that which would be seen by the microscope objective and the upper half being that seen by the photocell 12, the enlarged, back-projected image of the coarse scale divisions V being added to assist the explanation. The helical threads of the scale member employed in this example have an axial section of sawtooth formation providing at the measuring face 19 a profile of sawtooth form with sloping edges S and vertical fiduciary edges V.

The line of light produced by the scanning beam is shown at 23 divided into two sections by partition T3, and use of a line of light offers considerable advantages over the round or square spots obtained with the arrangement of Figure 6. Apart from the high degree of resolution obtainable, and the larger quantity of light passed into the system, a further distinction is provided between the voltage changes at the photocell 22, as compared with the corresponding changes R and Q of Figure 5. In fact the masking of the line of light by a sloping edge S occurs gradually and thus produces a gradual drop in cell current with a corresponding rise in voltage such as R1 (Figure 8) readily distinguishable from the abrupt change Q1 (due to appearance of the beam from behind an edge V) without relying on the difference in polarity. This feature permits the electro-optical system to remain operative during the return stroke of the carriage motion or return scan without the need for switching which, apart from adding complications, would tend to produce voltage changes not readily distinguishable from the desired change Q1.

Thus the waveform produced by the return scan is shown as a continuation of the waveform Q1, R1 of Figure 8 and includes opposite changes R2, Q2. When the line of light emerges from behind a vertical edge V, the sharp negative-going waveform Q1 is developed at photocell 22, and masking by a sloping edge S gives the slowly rising waveform R1. Masking by a vertical edge V on the return scan gives the sharply rising waveform Q2 while emergence of the beam from behind a sloping edge S gives the slowly falling waveform R2. The waveform obtained therefrom by differentiation is shown in the second row of Figure 10 and includes two sharp pulses of large amplitude and opposite sign together with two pulses of much smaller amplitude (e.g. at most one tenth) and long duration. Of these one of the sharp pulses, corresponding to Q1, is clearly distinguished from the other three signals and is used as a controlling signal. This pulse opens a gate which routes the remainder of the pulses generated by the interpolation scale to the counter. The number of these pulses is the measure of the distance of the edge V (Figure 8) from the right hand end 6 of the interpolation scale and hence the required fractional main scale displacement;

The interpolation scale on plate 5 contains more than 100 divisions, say 110, so that certain tolerances can be allowed on the limits of the scan. The scan must commence inside the middle third of the section 7 and end inside the middle third of section 11. This ensures that:

*I.* a length of scale containing at least 110 divisions is scanned;

*II.* that the line of light 23 disappears from the interpolation scale at the end of the forward scan by passing edge 6, and

*III.* that the line of light 23 is never obscured on the clear section 5" of the scale plate except by the form of the sawtooth coarse scale.

Condition (II) gives a signal at the end of the active or forward scan, which signal is required, as explained below, in order that the return scan may be distinguished from the forward scan. Condition (I) allows smooth transfer from one sawtooth scale edge to the next, and condition (III) allows clear distinction of the reference edges.

Figure 9:
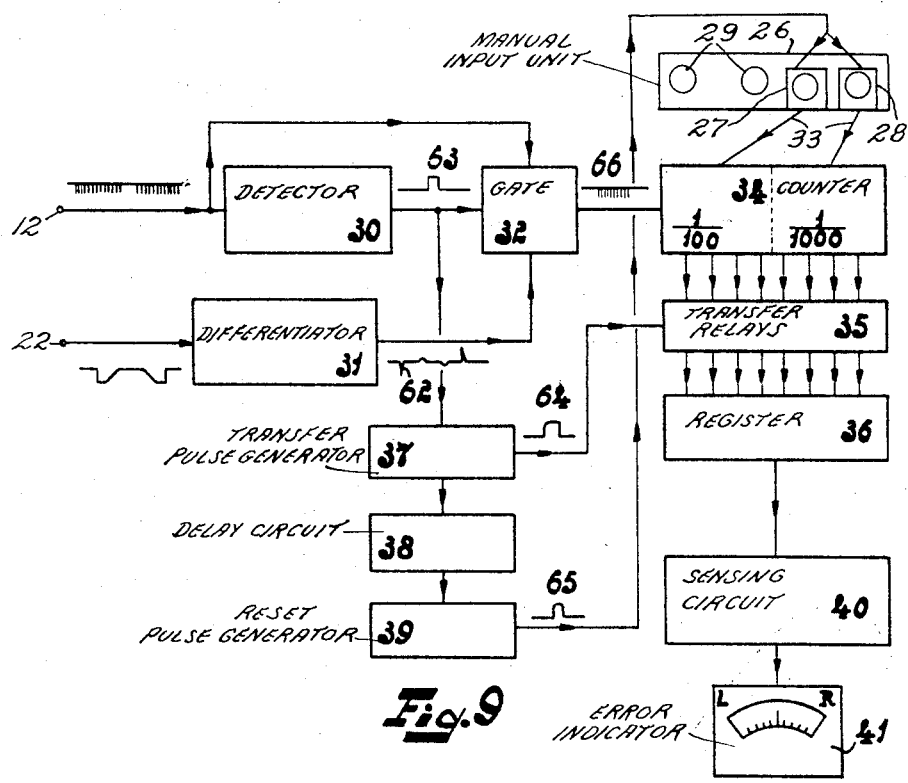
Fig. 9 is a block diagram of an electrical circuit used in the alternative embodiment of invention.
Figure 10:
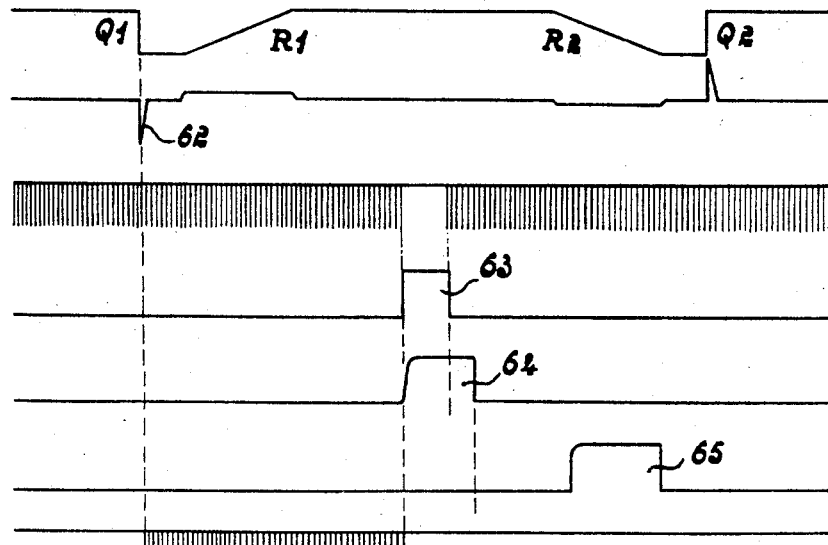
Fig. 10 shows the shapes of various electrical signals which occur in the diagram of Fig. 9.

Figure 9 is a block schematic diagram of the circuit arrangement for selecting and counting the pulses obtained from photocell 12 and displaying the corresponding interpolation measurement, while Figure 10 shows various waveforms obtained in the circuits of Figure 9.

The circuit arrangement comprises the following elements:

(a) a manual input unit 26 including control switches 27 and 28 for setting up respectively the hundredths and thousandths of an inch of the desired table position. Each switch has a control knob and further optional knobs 29 are shown which may be provided in connection with coarse setting of the table to the nearest tenth of an inch prior to interpolation.

(b) A detector circuit 30 for generating a gate-closing pulse 63 (Figures 9 and 10) at the end of each forward or active scan.

(c) A circuit 31 for differentiating the waveform Q1, R1, R2, Q2 (Figures 8 and 10) and obtaining the gate-opening pulse 62.

(d) A gate 32 actuated by pulses 62 and 63 so as to pass only the operative portion 66 of each pulse train derived from photocell 12.

(e) A counter 34 for counting the portion of each pulse train gated by gate 32, the initial state of the counter being set by the switches 27 and 28 to which it is connected by lines 33.

(f) A register 36 to which each successive count is passed in parallel from the counter 34 through transfer relays 35. This register may comprise, for example, resistor networks which add the counter signals to obtain a positive-polarity error signal or a negative-polarity error signal, the magnitude of the error signal indicating the amoun of error and the polarity indicating the direction of error.

(g) A transfer pulse generator 37 providing a transfer pulse 64 (Figures 9 and 10) derived from pulse 63 and used for closing simultaneously all the relays 35 for a controlled transfer time.

(h) A circuit 39 for generating a reset pulse 65 (Figures 9 and 10) derived from pulse 64 after a time delay set by a delay circuit 38. The reset pulse 65 is used to reset the counter via the switches of the manual input unit.

(i) A circuit 40 for obtaining from the register data the magnitude and sense of the table position error. This circuit converts the error signal into a voltage suitable for actuating the error indicator meter 41.

(j) A meter 41 for displaying the position error to the operator both in magnitude (as deviation from a zero position) and sense (left or right of the zero position). The meter 41 may comprise a zero-center voltmeter.

Briefly, each cycle of operation of the circuit arrangement comprises the following steps.

(a) The gated train of pulses representing a measurement is received by the counter 34 and is subtracted from the number previously set up therein by the input unit switches 27, 28.

(b) The transfer relays 35 are caused by circuits 30, 37 to close momentarily, and thereby:

(c) The difference or error held in the counter is transferred to the register 36 in parallel and thence to the display meter 41.

(d) The transfer relays 35 are opened again under the control of circuits 30 and 37.

(e) A delay is introduced by circuit 38 to permit step (d) which delay is necessitated by the sluggishness of the relays in opening.

(f) The counter 34 is reset by circuit 39 via switches 27, 28 to enable it to accept and count the next gated pulse train.

Steps (a) and (b) occur during the forward scan while steps (c) to (f) occur during the unused return scan, and operation of the system will now be described more fully.

The four knobs or dials of the manual input unit 26 are set up to give the position to which it is desired to set the table of the machine. At each scan a train of pulses is available equal in number to the total number of thousandths of an inch in the fraction of one tenth of an inch involved. The input unit may for example be set to 24.062" in which case, assuming that the table is moved by other means to within the appropriate 0.1" coarse scale division, the two dials concerned are those which are set at 6 (hundredths) and 2 (thousandths), i.e. the knobs of switches 27 and 28. If the sawtooth scale, and therefore also the table, happens to be in a position where each scan gives rise to 78 pulses, this means that the fractional displacement of the scale is .078". The two numbers 62 and 78 are to be compared and the magnitude and sign of the difference presented in a suitable form to the operator so that he may move the table of the machine (and hence the sawtooth scale) until just 62 pulses are contained in each pulse train. When this condition is reached, the display meter 41 reads zero and the table is positioned in accordance with the dictates of the setting of the input unit. Each scan and the resultant difference reading is independent of the previous scan and difference so that an independent estimate of table position error is available at every scan.

The counter 34 comprises two decade counter sections each made up of four bi-stable multivibrators and connected in series and hence the counter is capable of counting to 100 only. Advantage is taken of the fact that the counter can only count to 100 in order to secure smooth transfer from one sawtooth scale edge to the next while also avoiding the need to impose rigidly defined limits on the scan length and position which, as afore-mentioned, may vary slightly so long as more than 100 divisions are scanned.

The counter 34 is arranged so that, on receipt of successive pulses, the count represented by the state of the bi-stable multivibrators in the counter decreases by one for each pulse. For purposes of illustration, it will be assumed that the counter stands at 56 and that a train of pulses 100 in number are fed in. Then the counter goes through the following cycle:

56,55,54,53 . . . 3,2,1,0,99,98,97,96 . . . 59,58,57,56.

The last number in the cycle is the same as the first and hence a train of 100 pulses is indistinguishable in result from a train of 0 pulses. Assuming again that the count stands at 56 but that 24 pulses are fed in, the counter now goes through the sequence: 56,55,54, 53 . . . 35,34,33,32. It then stands at 32, which is the difference between 56 and 24. In each case the input unit is used for selecting the state (in this example 56) from which the subtractive count starts, and thus the required subtraction of pulse train from input setting is obtained.

As the required table position (i.e. the manual input unit setting) is increased in value, the edge V (Figure 8) is moved to the left. At a setting of between 80 and 90 thousandths of an inch, the next vertical edge to the right (V', Figure 8) is intercepted by the scan and a second gate-opening pulse 63 is generated during the forward scan. This has no effect as the gate 32 is already open. At a setting of 100 thousandths (or zero) 100 pulses are obtained from each scan of the interpolation scale 5'. From then on up to a manual setting of 10 to 20, depending upon whether the total number of pulses is 110 or 120, the number of pulses obtained is the manual setting plus 100 and appears to the counter as the manual setting alone because the counter recycles at the count of 100. Eventually the lefthand edge V is no longer intercepted by the scan and only one gate-opening pulse is generated, that of the right hand edge V'. Hence successive pulse counts might be: 113, 114, 115, 116, 17, 18 etc. due to the fact that the two edges V, V' are exactly 100 pulses apart. Hence no discontinuity occurs as counting changes from one edge V to another.

The transfer of the manual input setting to the counter is effected in parallel as follows. At the instant at which the counter is to be set to the input reading, a single reset pulse 65 is generated. It is fed simultaneously via switches 27, 28 and separate leads in the line 33 to each of the four stages of the two decade counter sections that make up the counter and for this purpose each line 33 contains 8 leads. Each switch is an eight-bank ten-way switch and the wiring of the banks and ways is such that the appropriate bi-stable multivibrators are reset to the appropriate state to represent the number given by the setting of the switches. It may happen that when reset occurs, "carry-over" will occur between stages in the counter and from the "thousandths" counter section. However, the reset pulse 65 is long enough to outlast any transient condition due to carry-over and the counter will, when the reset pulse ends, be in the desired state. Also, as soon as the reset pulse ends, the counter is ready to effect a further subtraction or comparison as previously described.

The pulsed output of photocell 12 is interrupted at the end of the forward scan when the line of light 23 passes the edge 6, such edge acting as a second fiduciary edge co-operating with the operative edge V. Rectification in unit 30 detects this break and clipping, sharpening and selection of the positive-going edge provides a signal 63 free of ambiguity which indicates that the forward scan is completed. This signal is used to shut the gate 32 immediately and to trigger the transfer pulse generator 37. The transfer pulse 64 thus obtained is used to close the transfer relays 35 and effect the parallel transfer of the difference number from the counter to the register. The delay circuit 38 allows time for the transfer relays to open and the reset pulse generator 39 provides the delayed reset pulse 65 for use as described earlier. Thus, the unused return scan provides time for the transfer and reset function to occur.

Should the number of pulses in a gated train be greater than the number set in the counter, the complement of the difference with respect to 100 will be obtained. Errors from 50 to 99 are taken to be negative errors, those from 0 to 49 as positive errors. The contents of the register 36 are examined for magnitude and sense of error by circuit 40 which generates a D.C. voltage of related amplitude and polarity. This D. C. voltage is fed to meter 41 which is a centre-zero meter providing an indication of the direction in which the table of the machine should be driven to reduce the error to zero.

In order that the correct edge V shall be used, it must have been placed within 50 thousandths of an inch, either way, of its final position. The coarse positioning system must be capable of this accuracy, and this has been assumed in the above description. If desired, a coarse positioning control system may be provided to compare electrically the actual position of the table with a desired coarse setting (i.e. inches and tenths of an inch) preset in the manual input unit with the aid of dials 29. Such a system may provide an indication on a separate centre-zero meter or other display device or it may be arranged to override the signals applied by circuit 40 to the meter 41 and hold the needle thereof to the left or right until the table has been brought to a position within 0.050" of the desired final position, at which stage control passes automatically to the fine control signal derived from circuit 40 which thus provides the operator with an entirely unambiguous indication.

The transfer relays may be electromagnetic relays or they may be replaced by diode transfer gate circuits. Moreover, the accuracy of the system may be increased from 0.001" to 0.0001" by providing a thousand divisions on the interpolation scale 5' and adding to the manual input unit 26 a further switch and dial unit similar to the units 27, 28 with a third section in the counter 34 for counting the tenths of a thousandth of an inch and other consequential alterations of the circuit arrangement.

While positioning of the table may be effected manually by an operator following the indications of the display meter 41, such indications may alternatively be used to control a servo system for positioning the table automatically. In the former case, the arrangement is preferably such that the amplitude of the error is indicated by the distance of the needle from the centre-zero position up to a selected maximum amplitude beyond which increasing errors give indications of constant or substantially constant amplitude.

By the present invention improved measuring apparatus are provided which are capable of operating reliably with a high degree of accuracy in a variety of applications.

What is claimed is:

1. Apparatus for measuring dimensions, comprising a coarse scale member having a coarse division thereon, said coarse division containing a fiduciary mark, a fine-scale means, a coarse scanning means for scanning a distance on said coarse scale at least equal to the length of said coarse division, means for scanning said fine-scale means, means for shifting said coarse scale relative to said scanning means and fine-scale means in accordance with the dimension to be measured, means for generating separate trains of electric pulses corresponding respectively to separate scannings of said fine-scale means, each of said trains of pulses comprising a plurality of pulses, means for synchronizing said trains of pulses with the scannings of said coarse scale member, pulse-counting means, and controlling means responsive to the scanning of the fiduciary mark of the coarse scale means to control said pulse-counting means to begin counting the number of pulses in one of said trains of said pulses.

2. Apparatus as claimed in claim 1, in which said coarse scanning means comprises means providing a first light beam adapted to scan said coarse scale, in which said means for generating trains of pulses comprises a second light beam adapted to scan said fine-scale means and a photocell positioned to receive pulsatory light variations from said fine-scale means in accordance with the graduations thereon, and in which said pulse-counting means comprises a pulse counter adapted to count the pulses generated by said photocell when an actuating pulse is received by said pulse counter, said course scanning means including another photocell positioned to intercept said first light beam so as to generate an actuating pulse when said first light beam scans said fiduciary mark, and said controlling means including means for feeding said actuating pulse to said pulse counter.

3. Apparatus as claimed in claim 1, in which said means for generating trains of pulses comprises means providing a light beam adapted to scan said fine-scale means thereby producing a train of scanning light pulses in accordance with the graduations on said fine scale and a photocell positioned to receive said scanning light pulses and correspondingly generate said trains of pulses, in which said coarse scanning means comprises means for projecting said light beam onto said coarse scale, and in which said pulse-counting means comprises a pulse counter adapted to count the pulses generated by said photocell when an actuating pulse is received by said pulse counter, said controlling means including another photocell positioned to receive said light beam which is projected onto said coarse scale after said coarse scale scanning means has scanned said fiduciary mark, circuit means connected to the output of said other photocell to produce an actuating pulse when said fiduciary mark is scanned, and means for feeding said actuating pulse to said pulse counter.

4. Apparatus as claimed in claim 1, comprising means adapted to automatically reset said pulse-counting means after said fine-scale scanning means has scanned said fine-scale means.

5. Apparatus as claimed in claim 1, in which said coarse division has a sawtooth shape an edge of which is substantially normal to the direction of said coarse scanning, and in which said fiduciary mark comprises said edge.

6. Apparatus as claimed in claim 1, including a visual count-display means connected to said pulse-counting means.

References Cited in the file of this patent
UNITED STATES PATENTS

| | | |
|---|---|---|
| 2,401,621 | Desch et al. | June 4, 1926 |
| 2,406,299 | Koulicovitch | Aug. 20, 1946 |
| 2,416,968 | Turrettini | Mar. 4, 1947 |
| 2,547,212 | Jamison et al. | Apr. 3, 1951 |
| 2,669,388 | Fox | Feb. 16, 1954 |
| 2,671,128 | Zworykin et al. | Mar. 2, 1954 |
| 2,685,047 | Moore | July 27, 1954 |
| 2,694,804 | Wagner | Nov. 16, 1954 |
| 2,710,934 | Senn | June 14, 1955 |
| 2,717,987 | Hagen | Sept. 13, 1955 |
| 2,735,005 | Steele | Feb. 14, 1956 |
| 2,748,665 | Senn | June 5, 1956 |